(12) United States Patent
Kagawa (10) Patent No.: US 7,339,703 B2
(45) Date of Patent: Mar. 4, 2008

(54) IMAGE PROCESSING APPARATUS AND METHOD THEREOF

(75) Inventor: Hidetsugu Kagawa, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 957 days.

(21) Appl. No.: 10/465,220

(22) Filed: Jun. 20, 2003

(65) Prior Publication Data

US 2004/0001230 A1   Jan. 1, 2004

(30) Foreign Application Priority Data

Jun. 28, 2002   (JP) .............................. 2002-190546

(51) Int. Cl.
*H04N 1/40*   (2006.01)
(52) U.S. Cl. ........................ 358/1.9; 358/2.1
(58) Field of Classification Search ................. 358/1.9, 358/2.1, 522, 518, 520, 1.15–1.16; 382/162–172
See application file for complete search history.

(56) References Cited

U.S. PATENT DOCUMENTS

| | | | | |
|---|---|---|---|---|
| 5,768,403 | A * | 6/1998 | Suzuki et al. ................. | 358/2.1 |
| 5,838,817 | A * | 11/1998 | Funada ........................ | 382/166 |
| 6,075,899 | A * | 6/2000 | Yoshioka et al. ........... | 382/233 |
| 7,145,693 | B2 | 12/2006 | Kagawa ...................... | 358/1.9 |
| 2006/0227382 | A1* | 10/2006 | Ng et al. .................... | 358/3.26 |

FOREIGN PATENT DOCUMENTS

| | | |
|---|---|---|
| JP | 8-174912 | 7/1996 |
| JP | 10-322565 | 12/1998 |
| JP | 11-127305 | 5/1999 |
| JP | 11-150655 | 6/1999 |
| JP | 2000-125124 | 4/2000 |
| JP | 2000-333001 | 11/2000 |
| JP | 2001-111840 | 4/2001 |
| JP | 2001-169101 | 6/2001 |
| JP | 3762267 | 1/2006 |

* cited by examiner

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

An image forming apparatus and method for performing appropriate attribute determination on a wide area of image data with a simple configuration of the apparatus and performing high-quality image forming are provided. A luminance signal of each pixel of a multi-valued image is inputted to the original document reading unit, and a color attribute of a pixel of interest is determined by the pixel attribute determination unit based on the luminance signal. In the main controller, the array attribute number determined in accordance with an array of the color attribute is counted with respect to 32 lines of a block, which is obtained by dividing a band having 64 lines of the multi-valued image into 8 blocks in the main scanning direction, and the determined color attribute is counted. Based on the counted value, a parameter indicative of an image characteristic of the block is calculated. Based on the counted value and the calculated parameter, an image attribute of the block is determined. Based on the determination result, an image attribute of the band is determined.

23 Claims, 6 Drawing Sheets

FIG. 6B

IMAGE PROCESSING APPARATUS AND METHOD THEREOF

FIELD OF THE INVENTION

The present invention relates to an image processing apparatus and method thereof, and more particularly, to an image processing apparatus and method thereof for determining an attribute of color image data in units of predetermined lines of the data.

BACKGROUND OF THE INVENTION

In conventional image forming apparatuses, various methods are employed to improve printing speed. For instance, in an image forming apparatus employing an inkjet printing method for the printing unit thereof, a black (Bk) printhead which is longer than printheads of other colors is provided to widen the range that can be printed at once, thereby improving printing speed.

Although the above conventional image forming apparatus employing an inkjet printing method can improve printing speed of a monochrome image by virtue of the long Bk printhead, there is not much improvement in printing speed of a color image. Therefore, if a monochrome image is processed as a color image by the image forming apparatus, improvement in printing speed cannot be expected.

Furthermore, in a case of performing color copying by an image forming apparatus comprising an original-document reading unit, if a monochrome image including characters or the like is processed as a color image due to a color drift which is caused at the time of reading, printing is performed with color ink instead of Bk ink, and pure monochrome printing cannot be performed.

SUMMARY OF THE INVENTION

The present invention has been proposed to solve the above-described conventional problems, and has as its object to provide an image forming apparatus and method thereof, which can perform appropriate attribute determination on a wide area of image data with a simple configuration of the apparatus, thus enabling to perform high-quality image forming.

In order to achieve the above objects, according to the present invention, there is provided an image processing apparatus comprising an input section for inputting a luminance signal of each pixel of a multi-valued image, a color attribute determination section for determining a color attribute of the pixel based on the luminance signal, storage for storing the color attribute determined by the color attribute determination section, with respect to pixels of a predetermined area including a pixel of interest, a first counting section for counting an array attribute determined in accordance with an array of the color attribute stored in the storage, with respect to a second block having a predetermined number of lines in a first block that is obtained by dividing a predetermined first line group of the multi-valued image in the main scanning direction, a second counting section for counting with respect to the second block the color attribute determined by the color attribute determination section, a calculation section for calculating a parameter indicative of an image characteristic of the first block, based on counted values of the first and second counting section, a block attribute determination section for determining an image attribute of the first block in accordance with the counted values of the first and second counting section and the parameter calculated by the calculation section and a line attribute determination section for determining an image attribute of the first line group based on a determination result of the block attribute determination section.

The image processing apparatus according to the present invention further comprises a final determination section for determining an image attribute of a third line group, included commonly in the first line group and the second line group, based on the determination result of the first line group determined by the line attribute determination section and a determination result of the predetermined second line group.

The image processing apparatus according to an embodiment of the present invention is characterized by the color attribute determination section includes a white pixel determination section for determining whether or not the pixel is a white pixel, a black pixel determination section for determining whether or not the pixel is a black pixel and a color pixel determination section for determining whether or not the pixel is a color pixel.

The image processing apparatus according to an embodiment of the present invention is characterized by the white pixel determination section determining whether or not the pixel is a white pixel by comparing the luminance signal with a predetermined threshold value.

The image processing apparatus according to an embodiment of the present invention is characterized by the black pixel determination section determining whether or not the pixel is a black pixel based on a comparison result between the luminance signal and a predetermined threshold value, and a comparison result between a difference value of color components of the luminance signal and a predetermined threshold value.

The image processing apparatus according to an embodiment of the present invention is characterized by the color pixel determination section determining the pixel as a color pixel in a case where the white pixel determination section and the black pixel determination section both determine in the negative, and in a case where a corresponding pixel of a previous line of the line, including the color pixel, in the sub-scanning direction is determined as a color pixel by the color attribute determination means, the color pixel determination section determines a color attribute of the pixel of interest as a continuous color pixel, whereas in a case where the corresponding pixel of the previous line of the line, including the color pixel, in the sub-scanning direction is not determined as a color pixel by the color attribute determination section, the color pixel determination section determines a color attribute of the pixel of interest as a non-continuous color pixel.

The image processing apparatus according to an embodiment of the present invention is characterized by the storage including line storage for storing a color attribute of each pixel with respect to a predetermined line of the multi-valued image and window storage for storing in a window form a color attribute of each pixel of the line stored in the line storage and a color attribute of each pixel of a next line of the line in the sub-scanning direction.

The image processing apparatus according to an embodiment of the present invention is characterized by the window storage including first window storage for storing the color attribute of each pixel in a first window form, which is constructed with M pixels in the main scanning direction and 2 pixels in the sub-scanning direction, and second window storage for storing the color attribute of each pixel in a second window form, which is constructed with N pixels in the main scanning direction and 2 pixels in the sub-scanning direction.

The image processing apparatus according to an embodiment of the present invention is characterized by the first counting section including a first array attribute counting section for obtaining a first array attribute number by counting in the second block unit a number of windows in a case where a pixel of interest is a color pixel and the pixel of interest has at least one adjacent black pixel, in the first window storage means, a second array attribute counting section for obtaining a second array attribute number by counting in the second block unit a number of windows in a case where a window area except four pixels on both edges vertically consecutively has color pixels and there is no black pixel in a window area including the four pixels on both edges, in the second window storage, a third array attribute counting section for obtaining a third array attribute number by counting in the second block unit a number of windows in a case where there are consecutive color pixels in a window area, having 1 pixels in the main scanning direction and 2 pixels in the sub-scanning direction, in the second window storage means, and a fourth array attribute counting section for obtaining a fourth array attribute number by counting in the second block unit a number of windows in a case where the pixel of interest is a color pixel and there is no black pixel in the periphery of the color pixel, in the first window storage means.

The image processing apparatus according to an embodiment of the present invention is characterized by the second counting section including a fifth array attribute counting section for obtaining a black pixel counted value by counting in the second block unit a number of pixels determined as a black pixel by the black pixel determination section.

The image processing apparatus according to an embodiment of the present invention is characterized by the calculation section including a first calculation section for obtaining a first parameter by using a ratio between the first array attribute number and the second array attribute number and a second calculation section for obtaining a second parameter by using a ratio between the fourth array attribute number and the black pixel counted value.

The image processing apparatus according to an embodiment of the present invention is characterized by the block attribute determination section determining the image attribute of the first block by respectively comparing the counted values of the first and second counting sections and the first parameter and the second parameter calculated by the calculation section, with respective predetermined threshold values.

The image processing apparatus according to an embodiment of the present invention is characterized by the line attribute determination section determining whether or not the image attribute of the first line group is a monochrome image based on the determination result of the block attribute determination section, and the final determination section determines the image attribute of the commonly included third line group as a monochrome image in a case where image attributes of the first line group and the second line group are determined as a monochrome image.

The image processing apparatus according to an embodiment of the present invention is characterized by the first line group and the second line group having the same number of lines.

The image processing apparatus according to an embodiment of the present invention is characterized by the third line group having half the number of lines as the first line group or the second line group.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

Figure 1:
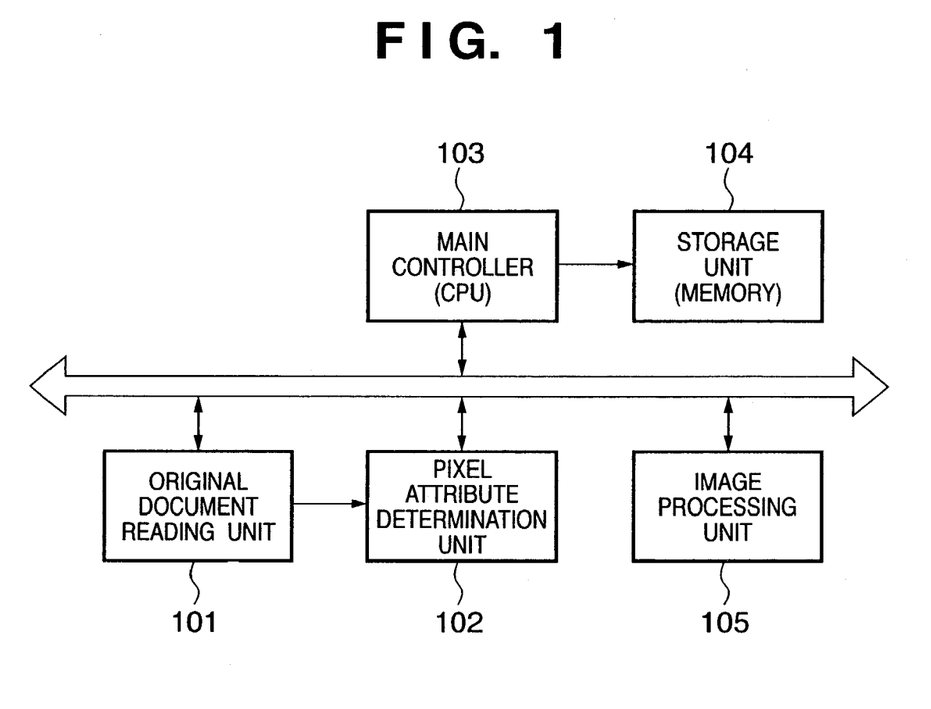
FIG. 1 is a block diagram showing a configuration of an image processing apparatus according to an embodiment of the present invention.

FIG. 1 is a block diagram showing a configuration of an image processing apparatus according to the embodiment of the present invention. As shown in FIG. 1, an original document reading unit 101, a pixel attribute determination unit 102, a main controller (CPU) 103, and an image processing unit 105 are connected to each other via a bus in the image processing apparatus. The original document reading unit 101 employs a CCD or a contact image sensor to read color image data of an original document, i.e., multi-valued image data including red (R), green (G), and blue (B), thereby obtaining a luminance signal of each pixel. The original document reading unit 101 is connected to the pixel attribute determination unit 102. The pixel attribute determination unit 102 compares the color image data, which is read by the original document reading unit 101, with a predetermined threshold value to determine an attribute in pixel unit, and performs counting of each attribute.

The main controller 103 controls the entire image processing apparatus through the system bus, and performs determination of the attributes based on the counted value of each attribute which is counted by the pixel attribute determination unit 102. The main controller 103 is connected to a storage unit (memory) 104. The memory 104 is used when the main controller 103 performs determination for a predetermined line. The image processing unit 105 performs high-quality processing in response to a determination result determined by the main controller 103.

Figure 2:
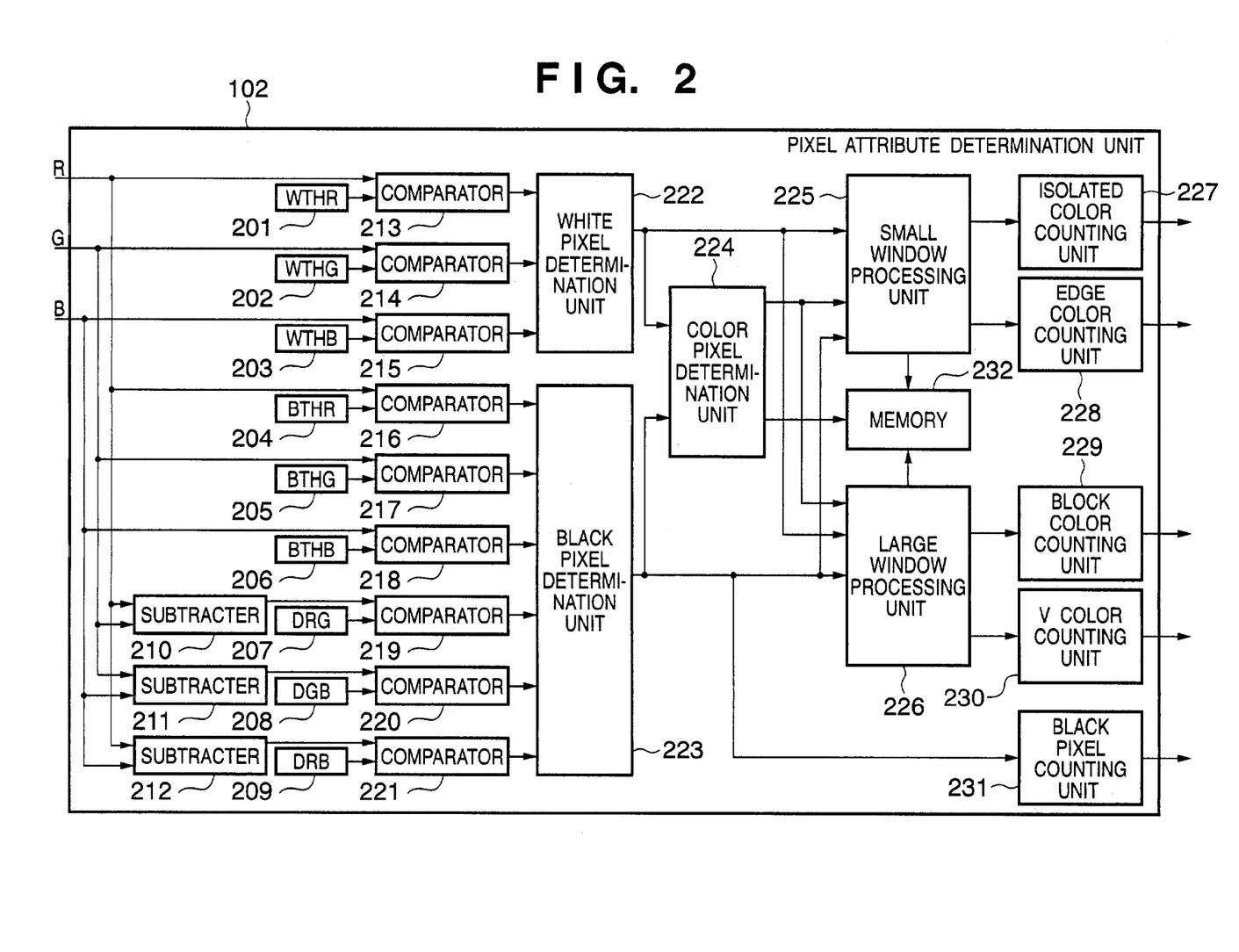
FIG. 2 is a block diagram showing a detailed configuration of a pixel attribute determination unit 102 shown in FIG. 1.

FIG. 2 is a block diagram showing a detailed configuration of the pixel attribute determination unit 102 shown in FIG. 1. Referring to FIG. 2, registers 201 to 209 are configured with a D-flip-flop (DFF) or the like, which stores parameters that are necessary for the determination unit 102 to determine in pixel unit an attribute of color image data read by the reading unit 101. In the registers, predetermined threshold values are set by the main controller 103.

The WTHR 201, WTHG 202, and WTHB 203 are threshold-value-set registers for determining whether or not each pixel data, inputted by the reading unit 101, is a white pixel. The WTHR 201 stores a determination level which is related to white pixel determination of a R-signal level of pixel data, inputted by the reading unit 101. In the similar manner, the WTHG 202 stores a determination level which is related to white pixel determination of a G-signal level, and the WTHB 203 stores a determination level which is related to white pixel determination of a B-signal level.

The BTHR 204, BTHG 205, BTHB 206, DRG 207, DGB 208, and DRB 209 are threshold-value-set registers for determining whether or not each pixel data, inputted by the reading unit 101, is a black pixel. The BTHR 204 stores a determination level which is related to black pixel determination of a R-signal level of pixel data, inputted by the reading unit 101. In the similar manner, the BTHG 205 stores a determination level which is related to black pixel determination of a G-signal level, and the BTHB 206 stores a determination level which is related to black pixel determination of a B-signal level.

The DRG 207 is a threshold-value-set register for determining whether or not pixel data, inputted by the reading unit 101, is a black pixel. In the DRG 207, a threshold value related to an absolute value of a difference between a R-signal level and a G-signal level is set. Similarly, in the DGB 208, a threshold value related to an absolute value of a difference between a G-signal level and a B-signal level is set, and in the DRB 209, a threshold value related to an absolute value of a difference between a R-signal level and a B-signal level is set.

Color image data read by the reading unit 101 is subjected to comparison with the threshold values, which are stored in the above-described threshold-value-set registers, in units of the signal component of each pixel. More specifically, with respect to white pixel determination, a comparator 213 compares a R-signal level of inputted pixel data with the threshold value set in the WTHR 201. If the R-signal level of the inputted pixel is higher than the predetermined threshold value set in the WTHR 201, the comparator 213 outputs a signal (High level) indicative of condition satisfaction.

In the similar manner, a comparator 214 compares a G-signal level of inputted pixel data with the threshold value set in the WTHG 202, and a comparator 215 compares a B-signal level of inputted pixel data with the threshold value set in the WTHB 203. If the respective signals are higher than the predetermined threshold values set in the WTHG 202 and WTHB 203, the comparators 214 and 215 respectively output a signal (High level) indicative of condition satisfaction. Accordingly, whether or not inputted pixel data is a white pixel can be determined.

With respect to black pixel determination, a comparator 216 compares a R-signal level of inputted pixel data with the threshold value set in the BTHR 204. If the R-signal level of the inputted pixel is lower than the predetermined threshold value set in the BTHR 204, the comparator 216 outputs a signal (High level) indicative of condition satisfaction. In the similar manner, a comparator 217 compares a G-signal level of inputted pixel data with the threshold value set in the BTHG 205, and a comparator 218 compares a B-signal level of inputted pixel data with the threshold value set in the BTHB 206. If the respective signals are lower than the threshold values set in the BTHG 205 and BTHB 206, the comparators 217 and 218 respectively output a signal (High level) indicative of condition satisfaction.

Furthermore, black pixel determination is performed by using comparators 219, 220, and 221 which employ absolute values of differences among the R-signal level, G-signal level, and B-signal level of inputted pixel data. More specifically, a subtracter 210 calculates an absolute value of a difference between a R-signal level and a G-signal level of inputted pixel data. The calculated value is compared with the threshold value related to an absolute value of a difference between a R-signal level and a G-signal level with respect to black pixel determination, which is set in the DRG 207. If the calculated value of the subtracter 210 is smaller than the threshold value set in the DRG 207, the comparator 219 outputs a signal (High level) indicative of condition satisfaction.

In the similar manner, a subtracter 211 calculates an absolute value of a difference between a G-signal level and a B-signal level of inputted pixel data, and the comparator 220 compares the calculated value with the threshold value related to an absolute value of a difference between a G-signal level and a B-signal level with respect to black pixel determination, which is set in the DGB 208. If the calculated value of the subtracter 211 is smaller than the threshold value set in the DGB 208, the comparator 220 outputs a signal (High level) indicative of condition satisfaction. A subtracter 212 calculates an absolute value of a difference between a R-signal level and a B-signal level of inputted pixel data, and the comparator 221 compares the calculated value with the threshold value related to an absolute value of a difference between a R-signal level and a B-signal level with respect to black pixel determination, which is set in the DRB 209. If the calculated value of the subtracter 212 is smaller than the threshold value set in the DRB 209, the comparator 221 outputs a signal (High level) indicative of condition satisfaction. As described above, the condition satisfaction is determined in a case where an absolute value of a difference between respective color components is smaller than a predetermined threshold value. Accordingly, an achromatic color, e.g., gray or the like, can be determined as a black pixel.

Next, a description is provided on determining white, black, and color pixels of inputted pixel data.

A white pixel determination unit 222 determines a white pixel of inputted pixel data based on outputted signals of the comparators 213 to 215. More specifically, if all the output signals of the comparators 213 to 215 are a signal (High level) indicative of condition satisfaction, the determination unit 222 determines that the inputted pixel is a white pixel, and outputs a determination signal.

A black pixel determination unit 223 determines a black pixel of inputted pixel data based on outputted signals of the comparators 216 to 221. More specifically, if all the output signals of the comparators 216 to 221 are a signal (High level) indicative of condition satisfaction, the determination unit 223 determines that the inputted pixel is a black pixel, and outputs a determination signal. A black pixel counting unit 231 counts black pixels when it receives an output signal from the black pixel determination unit 223.

Color pixel determination of inputted pixel data is performed by referring to an output signal of the white pixel determination unit 222 and an output signal of the black pixel determination unit 223. More specifically, if both of the output signals of the determination units 222 and 223 are not a signal (High level) indicative of condition satisfaction, a color pixel determination unit 224 determines that the inputted pixel data is a color pixel, and outputs a determination signal. In the foregoing manner, inputted pixel data can be determined as a white, black, or color pixel.

As described above, the pixel attribute determination unit 102 in the image processing apparatus according to the present invention is characterized by comprising the white pixel determination unit 222 which determines whether or not a pixel of interest is a white pixel, the black pixel determination unit 223 which determines whether or not a pixel of interest is a black pixel, and the color pixel determination unit 224 which determines whether or not a pixel of interest is a color pixel.

Further, the image processing apparatus according to the present embodiment is characterized in that the white pixel determination unit 222 determines whether or not a pixel of interest is a white pixel by comparing an inputted luminance signal with a predetermined threshold value. Moreover, the black pixel determination unit 223 determines whether or not a pixel of interest is a black pixel based on a comparison result of an inputted luminance signal with a predetermined threshold value and a comparison result of a difference value in respective color components of a luminance signal with a predetermined threshold value.

Next, a description is provided on an attribute categorizing method of a pixel of interest.

Determination results of the white pixel determination unit 222, black pixel determination unit 223, and color pixel determination unit 224 are inputted to a small window processing unit 225 and a large window processing unit 226. Memory 232 is connected to the small window processing unit 225 and large window processing unit 226. The memory 232 has a capacity for storing the number of pixels of one line in the main scanning direction, wherein two bits are provided for one input pixel.

Figure 3:
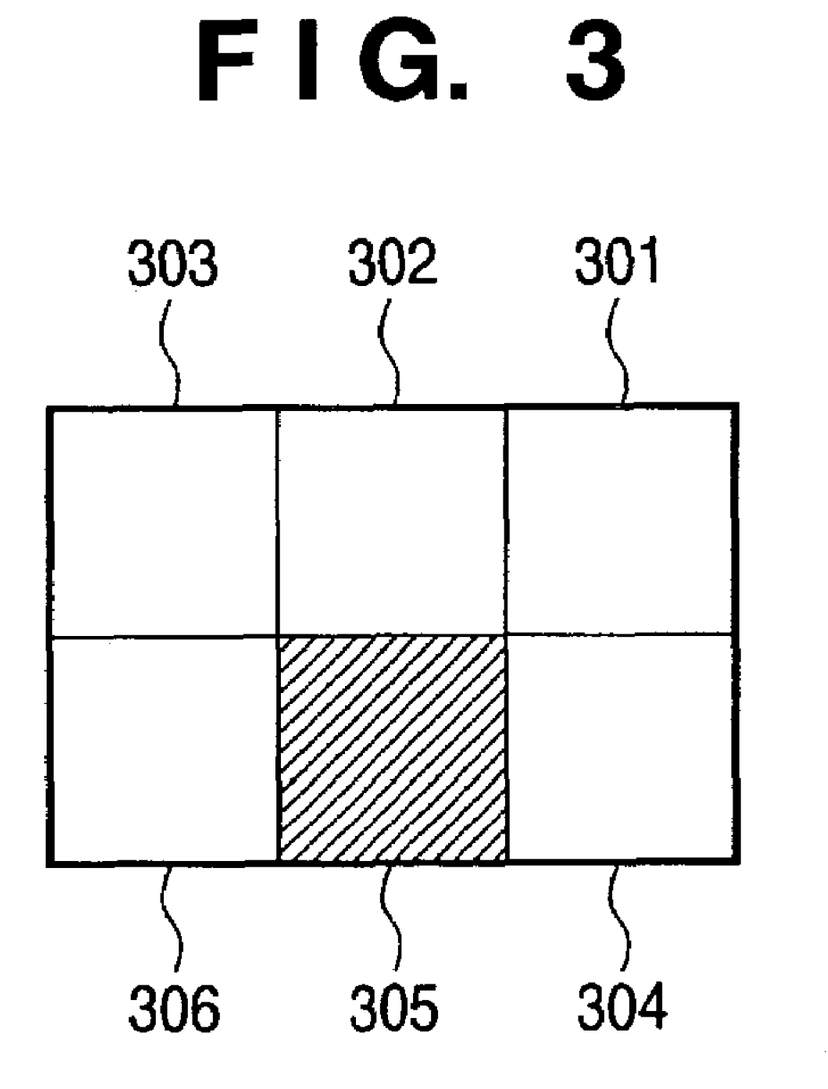
FIG. 3 is a view showing a window configuration for processing of a small window processing unit 225.
Figure 4:
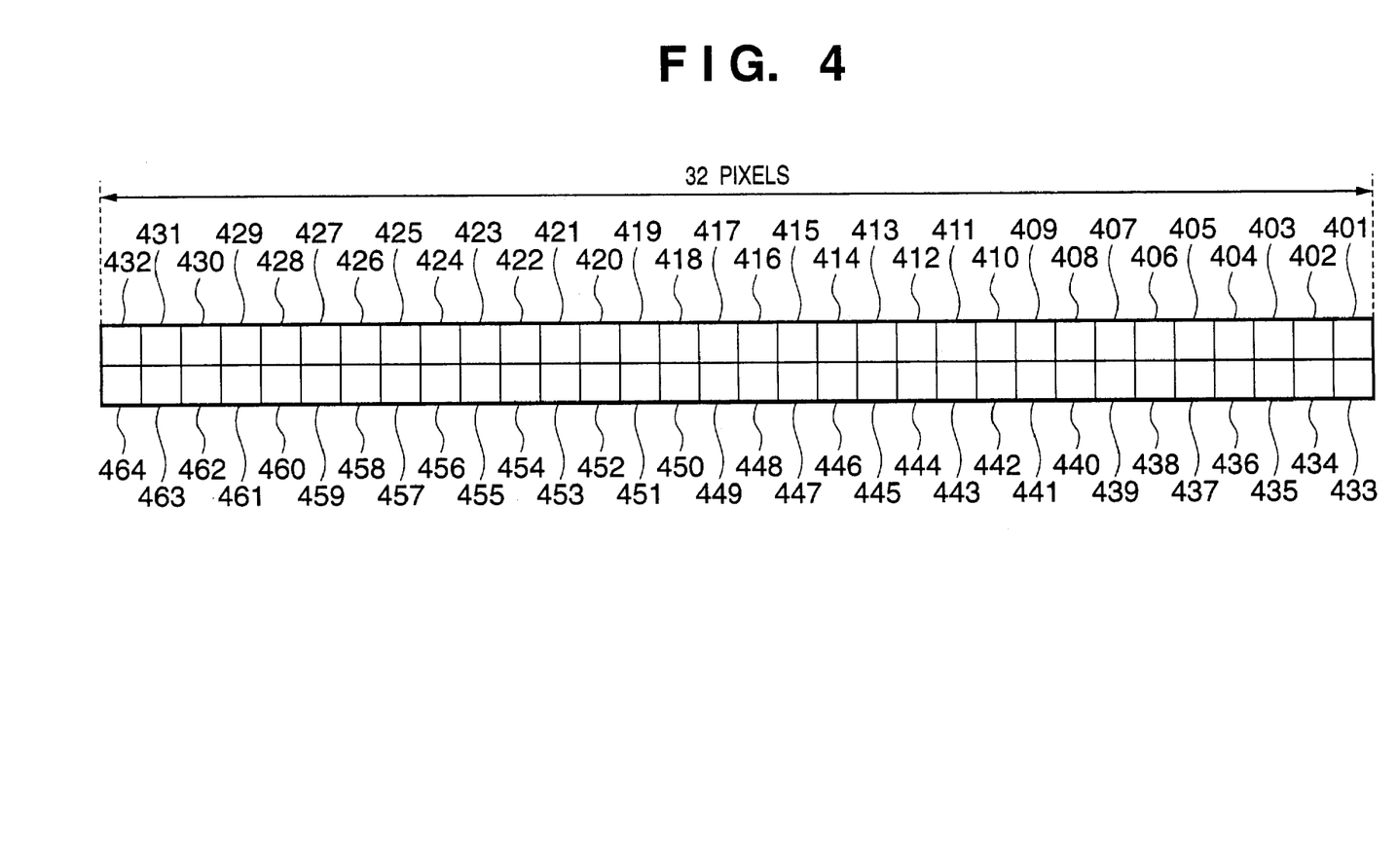
FIG. 4 is a view showing a window configuration for processing of a large window processing unit 226.

FIG. 3 is a view showing a window configuration for processing of the small window processing unit 225. FIG. 4 is a view showing a window configuration for processing of the large window processing unit 226. As can be seen in FIGS. 3 and 4, the small window processing unit 225 performs processing by adopting a window having 3 pixels in the main scanning direction and 2 pixels in the sub-scanning direction; whereas, the large window processing unit 226 adopts a window having 32 pixels in the main scanning direction and 2 pixels in the sub-scanning direction.

Referring to FIG. 3, numerals 301 to 306 denote registers, each storing a determination result corresponding to an inputted pixel. In the shift registers, stored data is shifted to the subsequent registers of respective lines at the timing of pixel data input. In other words, at the timing the pixel data is inputted, data stored in the register 301 is shifted to the register 302, and data stored in the register 304 is shifted to the register 305.

Similar to FIG. 3, numerals 401 to 464 in FIG. 4 denote registers, each storing a determination result corresponding to an inputted pixel. In the shift registers, stored data is shifted to the subsequent registers of respective lines at the timing of pixel data input. In other words, at the timing the pixel data is inputted, data stored in the register 401 is shifted to the register 402, and data stored in the register 433 is shifted to the register 434.

In the registers 301 and 401, a determination result of a pixel of the previous line, which is obtained from the memory 232, is stored. In the registers 304 and 433, a determination result of the currently inputted pixel is stored.

As described above, the image processing apparatus according to the present embodiment is characterized in that a color attribute for each pixel of a predetermined line of a multi-valued image is stored, and that the color attribute for each pixel of the predetermined line and a color attribute for each pixel of the subsequent line of the aforementioned line in the sub-scanning direction are stored in a window form.

Furthermore, the image processing apparatus according to the present embodiment is characterized in that the memory 232 stores a color attribute for each pixel in a first window form, having M pixels in the main scanning direction and 2 pixels in the sub-scanning direction, and a color attribute for each pixel in a second window form, having N pixels in the main scanning direction and 2 pixels in the sub-scanning direction. In this embodiment, M is 3, and N is 32.

The small window processing unit 225 and the large window processing unit 226 respectively determine an attribute of a pixel of interest based on the determination result of each pixel of the previous line and a determination result of each pixel of the currently reading line, as shown in FIGS. 3 and 4.

Once the determination result is read out of the memory 232 and stored in the registers 301 and 401, it is no longer necessary. Therefore, in the address of the memory 232 which has stored the determination result, a determination result of a newly inputted pixel is stored. Thus, the memory 232 storing the determination result of the previous line at least needs a capacity corresponding to the number of pixels of one line in the main scanning direction of the inputted original document image data.

The data stored in the registers 301 to 306 and 401 to 464 and the memory 232 are initialized to a white pixel determination result in units of an original document processed, or in units of a processing line. Note that the register 305, indicated in black in FIG. 3, corresponds to determination data of a pixel of interest, subjected to determination.

In a case where a pixel inputted to the small window processing unit 225 or the large window processing unit 226 is a white pixel, the processing unit 225 or 226 stores 2-bit data, which indicates that the inputted pixel is a white pixel, in the respective registers shown in FIGS. 3 and 4. In this embodiment, the data indicating that the inputted pixel is a white pixel is "11".

In a case where an inputted pixel is a black pixel, the small window processing unit 225 or the large window processing unit 226 stores 2-bit data, which indicates that the inputted pixel is a black pixel, in the respective registers. In this embodiment, the data indicating that the inputted pixel is a black-pixel is "00".

In a case where an inputted pixel is a color pixel, the small window processing unit 225 or the large window processing unit 226 stores 2-bit data, which indicates that the inputted pixel is a color pixel, in the respective registers. In this embodiment, the data indicating that the inputted pixel is a color pixel is "10" or "01". More specifically, if a pixel determination result of the previous line of the inputted pixel is a color pixel, "01" indicative of continuous color pixel determination is stored in the register. If a pixel determination result of the previous line of the inputted pixel is a white pixel or a black pixel, "10" indicative of non-continuous color pixel determination is stored in the register. As described above, the present embodiment not only performs determination of whether or not inputted image data is a color pixel, but also determines whether or not the color pixel is a continuous color pixel or a non-continuous color pixel.

In the image processing apparatus according to the present invention, the color pixel determination unit 224 determines a pixel of interest as a color pixel if the white pixel determination unit 222 and the black pixel determination unit 223 both determine in the negative. When a corresponding pixel of the previous line in the sub-scanning direction of the line including the color pixel of interest is determined as a color pixel, the determination unit 224 determines the color attribute of the pixel of interest as a continuous color pixel, but the corresponding pixel of the previous line in the sub-scanning direction of the line including the color pixel of interest is not determined as a color pixel, the determination unit 224 determines the color attribute of the pixel of interest as a non-continuous color pixel.

Next, processing of an edge color counting unit 228 is described. The edge color counting unit 228 counts color pixels accompanying a black character by detecting them by the small window processing unit 225. To be more specific, at the timing pixel data is inputted to the small window processing unit 225, a color pixel determination result "10" or "01" is stored in the register 305 which stores determination data of a pixel of interest. If a determination result "00" indicative of black pixel determination is stored in the periphery of the pixel of interest, i.e., in any of the registers 301 to 304 and 306, the small window processing unit 225 outputs a signal to the edge color counting unit 228. The edge color counting unit 228 counts the number of edge color pixels based on the received output signal.

Next, processing of an isolated color counting unit 227 is described. The isolated color counting unit 227 counts color pixels that do not accompany a black character by detecting them by the small window processing unit 225. To be more specific, at the timing pixel data is inputted to the small window processing unit 225, a color pixel determination result "10" or "01" is stored in the register 305 which stores determination data of a pixel of interest. If a determination result "00" indicative of black pixel determination is not stored in the periphery of the pixel of interest, i.e., in any of the registers 301 to 304 and 306, the small window processing unit 225 outputs a signal to the isolated color counting unit 227. The isolated color counting unit 227 counts the number of color pixels based on the received output signal.

Next, processing of a V color counting unit 230 is described. The V color counting unit 230 counts color vertical lines by detecting them by the large window processing unit 226. To be more specific, at the timing pixel data is inputted to the large window processing unit 226, if a color pixel determination result "10" or "01" is vertically consecutively (e.g., registers 416 and 448) stored in the registers except the registers on both edges (registers 401, 432, 433, 464), and if a determination result "00" indicative of black pixel determination is not stored in all registers including the registers on both edges, the large window processing unit 226 outputs a signal to the V color counting unit 230. The V color counting unit 230 counts the number of V color pixels based on the received output signal.

A block color counting unit 229 counts color pixels across a wide area by detecting them by the large window processing unit 226. To be more specific, at the timing similar to that of the V color counting unit 230, if a consecutive color pixel determination result "01" is stored for an area larger than an area of 16×2 pixels in all the registers (e.g., "01" is stored in the registers 410 to 425 and 442 to 457), the large window processing unit 226 outputs a signal to the block color counting unit 229. The block color counting unit 229 counts the number of block color pixels based on the received output signal. Note, although this embodiment gives an example of an area of 16×2 pixels, the present invention is applicable to an area other than this size.

In other words, the pixel attribute determination unit 102 of the image processing apparatus according to the present invention is characterized by comprising the edge color counting unit 228, V color counting unit 230, block color counting unit 229, and isolated color counting unit 227. The edge color counting unit 228 obtains a first array attribute number by counting in the second block unit the number of windows with the small window processing unit 225 in a case where a pixel of interest is a color pixel and the pixel of interest has at least one adjacent black pixel. The V color counting unit 230 obtains a second array attribute number by counting in the second block unit the number of windows with the large window processing unit 226 in a case where vertically consecutive windows except the four pixels on both edges have color pixels and a case where there is no black pixel in the windows including the four pixels on both edges. The block color counting unit 229 obtains a third array attribute number by counting in the second block unit the number of windows with the large window processing unit 226 in a case where there are consecutive color pixels in a window area, having I pixels in the main scanning direction and 2 pixels in the sub-scanning direction. The isolated color counting unit 227 obtains a fourth array attribute number by counting in the second block unit the number of windows with the small window processing unit 225 in a case where a pixel of interest is a color pixel and there is no black pixel in the periphery of the color pixel.

The main controller 103 determines whether a predetermined area is a monochrome image or a color image based on the counted result of the above-described counting units of the pixel attribute determination unit 102. Note in this embodiment, an area corresponding to 64 lines in the sub-scanning direction is defined as "one band," and an area divided into 8 regions in the main scanning direction is defined as "one block." The aforementioned determination is performed in units of the block. The unit of determination band is not limited to 64 lines in the sub-scanning direction, but an area larger than or smaller than 64 lines is applicable to the present invention. Moreover, the number of divisions in the main scanning direction is not limited to 8 divisions, but the aforementioned determination may be performed on an area divided into a smaller number of regions or a larger number of regions.

Figure 5:
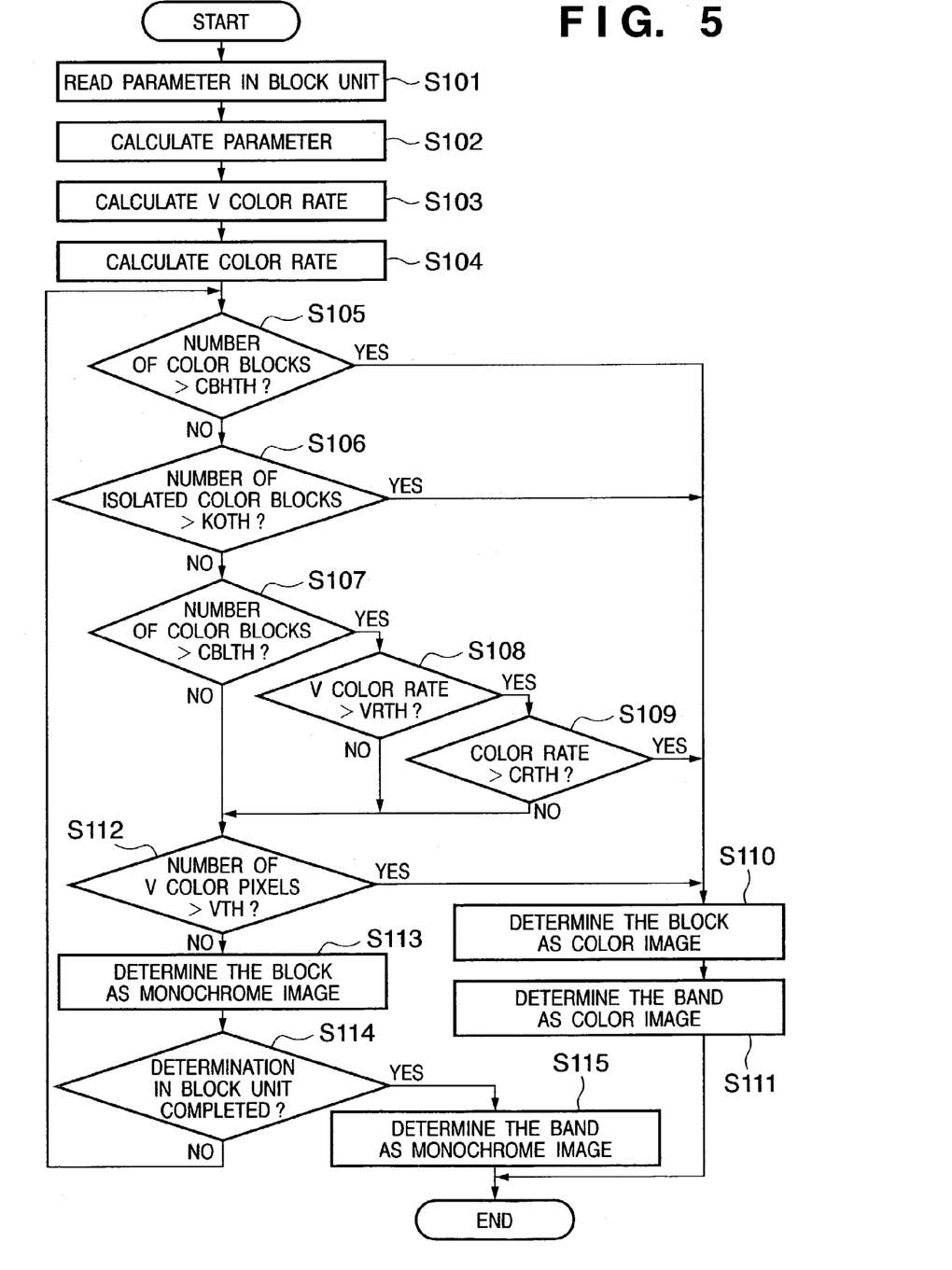
FIG. 5 is a flowchart describing determination processing in band unit, which is performed by a main controller 103.

FIG. 5 is a flowchart describing determination processing in band unit, which is performed by the main controller 103. When counting for ½ of the 64 lines constituting the band, i.e., 32 lines, is performed by the counting units of the pixel attribute determination unit 102, the main controller 103 reads the counted value in block unit and resets the value of each counting unit (step S101). In other words, in this embodiment, each counting unit is initialized at the timing the counting for 32 lines is completed. At this stage, a counted value for the previous 32 lines is stored in the memory 104. Note in the present invention, the reading timing of each counted value is not limited to ½ of the lines of the band, but a larger or a smaller number of lines is applicable.

Next, the counted value for the previous 32 lines stored in block unit in the memory 104 is added to the counted value for the current 32 lines read from each counting unit, thereby calculating the counted value of the black, white, and color pixels for the 64 lines (step S102). Upon completion of the adding operation, the memory 104 stores in block unit the counted value for the current 32 lines.

Next, based on the V color counted value and the edge color counted value, the following calculation is performed to obtain a V color rate (step S103).

$$(V \text{ color rate}) = (\text{number of } V \text{ color pixels}) / (\text{number of edge color pixels}) \ldots \quad (1)$$

It can be assumed that a block, whose V color rate is close to 1, is a character area.

In step S104, based on the isolated color counted value and the black pixel counted value, the following calculation is performed to obtain a color rate (step S104).

$$(\text{color rate}) = (\text{number of isolated color pixels}) / (\text{number of black pixels}) \ldots \quad (2)$$

It can be assumed that a band having a high color rate includes a large color image.

In other words, the present invention is characterized in that the main controller 103 obtains a black pixel counted value by counting in the second block unit the pixels which are determined as a black pixel by the black pixel determination unit 223. Furthermore, the image processing apparatus according to the present invention is characterized in that the main controller 103 obtains a first parameter by using a ratio between the number of edge color pixels and the number of V color pixels, and obtains a second parameter by using a ratio between the number of isolated color pixels and the number of black pixels.

As described above, the main controller 103 obtains a determination factor for 64 lines by calculating the equations (1) and (2) based on the counted value for 32 lines counted in block unit by each counting unit. Based on the determination factor, an attribute of each block is determined in the following manner.

First, it is determined whether or not the number of color blocks is larger than a predetermined value CBHTH (step S105). If it is determined that the number of color blocks is larger than CBHTH (YES), the block of interest is determined as a color image area (step S110). This is because it can be assumed that the block of interest has a solid-filled color image in a large area.

Further, if it is determined that the number of color blocks is smaller than CBHTH (NO) and if the number of isolated color pixels is larger than a predetermined value KOTH (YES in step S106), the block of interest is determined as a color image area (step S110). The determination of color image area is made because it can be assumed that the block of interest is a halftone dot image having few black dots.

Meanwhile, if determination is NO in step S106 and the number of color blocks is larger than CBLTH (YES in step S107), and further if the V color rate is smaller than a predetermined value VRTH (YES in step S108) and if the color rate is larger than a predetermined value CRTH (YES in step S109), the block of interest is determined as a color image area (step S110) because it can be assumed that a halftone dot image is detected. Note although this embodiment assumes CBLTH<CBHTH, the present invention is not limited to this.

Meanwhile, if determination is NO in steps S107, S108, or S109, and the number of V color pixels is larger than VTH (YES in step S112), the block of interest is determined as a color image area (step S110).

If determination is NO in step S112, the block of interest is determined as a monochrome image area (step S113). In other words, if a color vertical line is not detected in the block whose attribute is not yet determined in the above-described steps, the block is determined as a monochrome image area. As described above, the present invention is characterized in that an attribute of each block is determined by comparing the counted value, the first parameter (V color rate), and the second parameter (color rate) with respective predetermined threshold values by the main controller 103.

As described above, color/monochrome attribute determination is made in block unit, and based on the determination result, further color/monochrome attribute determination is made in band unit (64 lines).

Next, a description is provided on a method of attribute determination in band unit using the result of attribute determination in block unit.

In step S110, if it is determined that the block of interest is a color image area, the band including the block of interest is determined as a color image area (step S111) even if the band includes a block that is not yet determined. In other words, if there is one block determined as a color image area, the band is determined as a color area. Note, although this embodiment determines a band as a color area when the band includes one block which is determined as a color image area, an application of the present invention is not limited to this. All blocks of the band may be subjected to color/monochrome attribute determination, and color/monochrome attribute determination of the band may be performed based on a combination of determination results of the blocks. For instance, if a band includes three or more blocks determined as a color area, the band may be determined as a color image area. Moreover, if a band includes two consecutive blocks determined as a color area, the band may be determined as a color image area.

Meanwhile, if the block of interest is determined as a monochrome image area in step S113 and the band of interest includes a block whose attribute is not yet determined (NO in step S114), the control returns to step S105 where the above-described attribute determination is performed with respect to the undetermined block. If color/monochrome attribute determination is completed for all blocks in the band of interest (YES in step S114) and all blocks are determined as a monochrome image area, the band of interest is determined as a monochrome image area (step S115). As described above, the present embodiment performs color/monochrome attribute determination in band unit (64 lines). In other words, the present invention is characterized in that the main controller 103 determines based on a determination result of a block whether or not a first line group is a monochrome image, and as final determination means, in a case where the first line group and a second line group are determined as a monochrome image, determines a commonly included third line group as a monochrome image.

Figure 6A:
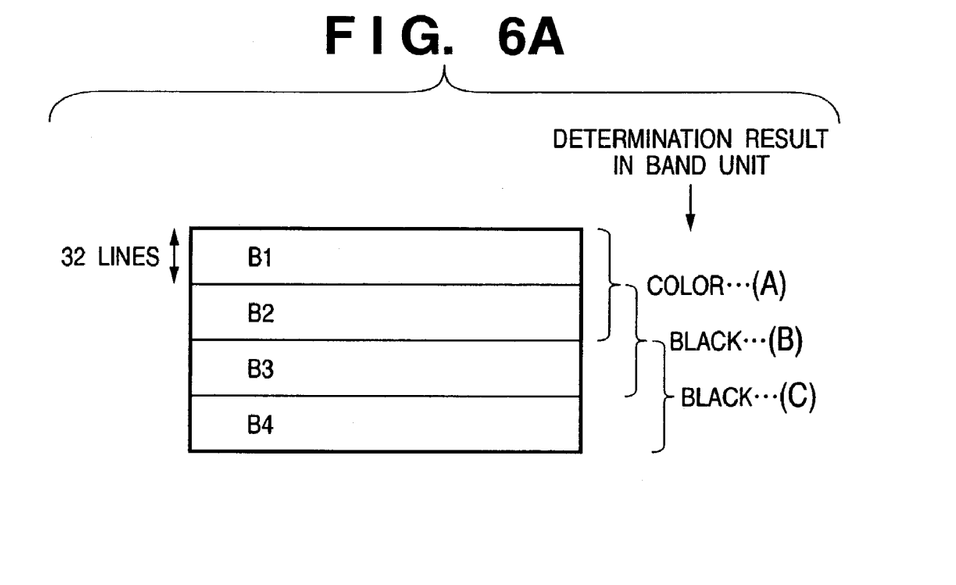
FIGS. 6A and 6B are explanatory views showing an example of final attribute determination processing in ½ band unit according to the embodiment.
Figure 6B:
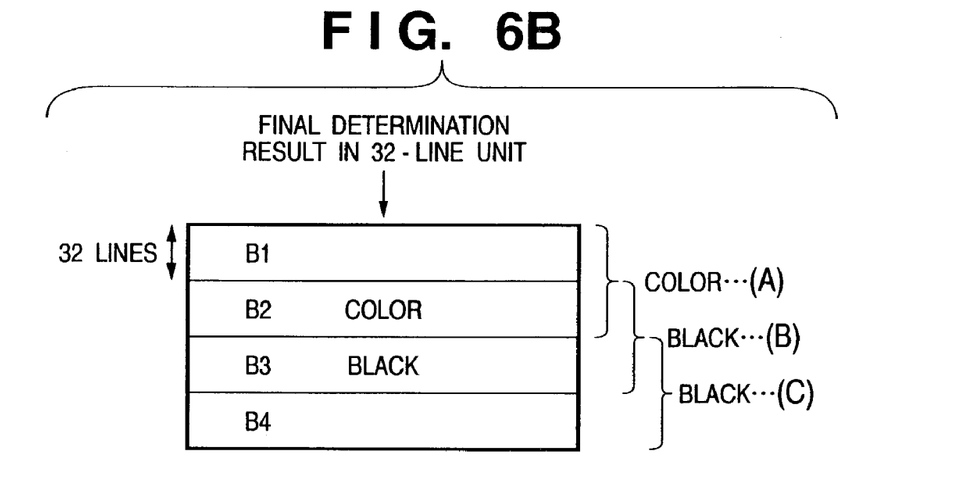

Furthermore, it may be constructed such that final determination processing is performed using the determination result in band unit. Hereinafter, the final determination processing will be described. FIGS. 6A and 6B are explanatory views showing an example of final attribute determination processing in ½ band unit (32 lines) according to the present embodiment.

In the above description, the main controller 103 calculates the determination factor of one band (64 lines) based on the counted value of each counting unit read in units of 32 lines and the result of each calculation of the equations (1) and (2), and performs the determination processing shown in FIG. 5 in block unit based on the calculated determination factor, thereby performing color/monochrome attribute determination in band unit.

FIG. 6A shows an example of an original document image, where 64-line bands are constructed with data regions B1 to B4 each having 32 lines. As shown in FIG. 6A, the 64-line data (band A) constructed with regions B1 and B2 is determined as a color image area by the determination processing shown in FIG. 5. Similarly, 64-line data (band B) constructed with regions B2 and B3 is determined as a monochrome image area, and 64-line data (band C) constructed with regions B3 and B4 is determined as a monochrome image area.

Hereinafter, a description is provided on an example of final determination with respect to the data shown in FIG. 6A. Instead of making final determination based only upon the above-described determination which is made in units of 64 lines, determination results of two bands, which are constructed with 64 lines, are used to perform regional determination of 32 lines having overlapped determination results. To be more specific, based on the determination results of the band A and band B, final determination is made with respect to the region B2 having 32 lines. Similarly, based on the determination results of the band B and band C, final determination is made with respect to the region B3 having 32 lines. Only in a case where the previous and the following 64 lines including the 32 lines subjected to final determination are determined as a monochrome image, the 32 lines are determined as a monochrome image area as the final determination.

The final determination results for the example of FIG. 6A are shown in FIG. 6B. In this example, the determination result of the band A is a color image area, while the determination result of the band B is a monochrome image area. Therefore, the final determination of the region B2 is a color image area. Further, since the determination results of the band B and band C are a monochrome image area, the final determination of the region B3 is a monochrome image area. As described above, the present invention is characterized in that the first line group and the second line group have the same number of lines. Furthermore, the present invention is characterized in that the third line group has half the number of lines of the first line group or the second line group.

As a determination result signal which is outputted from the main controller 103, 1-bit data is outputted since the signal only needs to express whether it is a monochrome image or a color image. To be more specific, a "High level" signal is outputted in a case of a monochrome image, and a "Low level" signal is outputted in a case of a color image. The determination result signal outputted from the main controller 103 is used for high-quality image processing in the image processing unit 105. For instance, with respect to a pixel determined to be a black pixel, the pixel is determined as a black character area, and image processing appropriate for a character area is performed. Meanwhile, with respect to a pixel determined not to be a black pixel, image processing appropriate for, e.g., a photograph area, is performed. As described above, the present invention is characterized by further comprising the image processing unit 105, which performs image processing on the third line group, that is appropriate for an image attribute of the third line group determined by the main controller 103.

Note although the present embodiment describes an example where the attribute determination in band unit is performed as a software operation in the main controller 103, it may be constructed such that the determination in band unit is realized by hardware.

Furthermore, each of the threshold values used in the attribute determination may be of a fixed value, or a variable value that can be set arbitrarily in accordance with an operation mode of the apparatus.

As has been described above, according to the present embodiment, monochrome image determination can be performed in band unit with a simple configuration. Therefore, in a case where color copying operation is performed by an image forming apparatus employing an inkjet printing method, with respect to a band determined as a monochrome image, printing can be performed with the Bk printhead that is longer than the color printhead. By virtue of this, the printing speed can be more improved than a case where only the color printhead is used. Moreover, the present invention may further comprise an image printing unit which performs printing of a multi-valued image in units of predetermined lines, which have the same number of lines as the third line group. Furthermore, the image printing unit may comprise a monochrome printhead and a color printhead, employing an inkjet printing method, and the monochrome printhead may be provided longer than the color printhead.

Since an area determined as a monochrome image is not treated as color data, it is possible to reduce the amount of data transmitted to the subsequent image processing unit, and the printing speed can be improved.

Furthermore, it is possible to prevent such trouble where a monochrome image, e.g., black characters or the like, is processed as a color image due to a color drift caused by an original-document reading unit.

Moreover, since black characters are printed in black ink instead of color ink, it is possible to improve the quality of black characters.

As has been described above, in the image processing apparatus according to the present invention, a luminance signal is inputted to the original document reading unit 101 in units of a pixel of a multi-valued image, a color attribute of a pixel of interest is determined by the pixel attribute determination unit 102 based on the luminance signal, and the determined color attribute is stored for pixels of a predetermined area which includes the pixel of interest. In the main controller 103, the array attribute number determined in accordance with an array of the stored color attribute is counted with respect to 32 lines of the first block, which is obtained by dividing a predetermined band (first line group) having 64 lines of a multi-valued image into 8 blocks in the main scanning direction, and the determined color attribute is counted with respect to 32 lines. Based on the counted value, a parameter indicative of an image characteristic of the block is calculated. Based on the counted value and the calculated parameter, an image attribute of the block is determined. Then based on the determination result, an image attribute of the band is determined.

Furthermore, the main controller 103 of the image processing apparatus according to the present invention is characterized by determining an image attribute of a third line group, which is included commonly in the first line group and the second line group, based on a determination result of the first line group and a determination result of a predetermined ½ band (second line group).

Note that the present invention can be applied to a system constituted by a plurality of devices (e.g., host computer, interface, reader, printer and the like) or to an apparatus comprising a single device (e.g., copying machine, facsimile machine or the like).

Further, the object of the present invention can also be achieved by providing a storage medium (or recording medium), storing program codes of software realizing the above-described functions of the embodiment, to a computer system or apparatus, reading the program codes, by a CPU or MPU of the computer system or apparatus, from the storage medium, then executing the program. In this case, the program codes read from the storage medium realize the functions according to the embodiment, and the storage medium storing the program codes constitutes the invention. Furthermore, besides the functions according to the above embodiment being realized by executing the program codes which are read by a computer, the present invention includes a case where an OS (operating system) or the like working on the computer performs a part or the entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or the entire process in accordance with designations of the program codes and realizes functions of the above embodiment.

As has been described above, the present invention can perform appropriate attribute determination on a wide area of image data with a simple configuration of the apparatus, thus enabling to perform high-quality image forming.

The present invention is not limited to the above embodiment and various changes and modifications can-be made within the spirit and scope of the present invention. Therefore, to apprise the public of the scope of the present invention, the following claims are made.

What is claimed is:

1. An image processing apparatus comprising:
   an input section, arranged to input a luminance signal of each pixel of a multi-valued image;
   a color attribute determination section, arranged to determine a color attribute of the pixel based on the luminance signal;
   a storage section, arranged to store the color attribute, determined by said color attribute determination section, with respect to pixels of a predetermined area including a pixel of interest;
   a first counting section, arranged to count an array attribute, determined in accordance with an array of the color attribute stored in said storage section, with respect to a second block having a predetermined number of lines in a first block, wherein the first block is obtained by dividing a predetermined first line group of the multi-valued image in the main scanning direction;
   a second counting section, arranged to count with respect to the second block the color attribute determined by said color attribute determination section;
   a calculation section, arranged to calculate a parameter, indicative of an image characteristic of the first block, based on counted values of said first and second counting sections;
   a block attribute determination section, arranged to determine an image attribute of the first block in accordance with the counted values of said first and second counting sections and the parameter calculated by said calculation section; and
   a line attribute determination section, arranged to determine an image attribute of the first line group based on a determination result of said block attribute determination section.

2. The image processing apparatus according to claim 1, further comprising a final determination section arranged to determine an image attribute of a third line group, included commonly in the first line group and the second line group, based on the determination result of the first line group determined by said line attribute determination section and a determination result of the predetermined second line group.

3. The image processing apparatus according to claim 1, wherein said color attribute determination section comprises:
   a white pixel determination section, arranged to determine whether or not the pixel is a white pixel;
   a black pixel determination section, arranged to determine whether or not the pixel is a black pixel; and
   a color pixel determination section, arranged to determine whether or not the pixel is a color pixel.

4. The image processing apparatus according to claim 3, wherein said white pixel determination section determines whether or not the pixel is a white pixel by comparing the luminance signal with a predetermined threshold value.

5. The image processing apparatus according to claim 3, wherein said black pixel determination section determines whether or not the pixel is a black pixel based on a comparison result between the luminance signal and a predetermined threshold value, and a comparison result between a difference value of color components of the luminance signal and a predetermined threshold value.

6. The image processing apparatus according to claim 3, wherein said color pixel determination section determines the pixel as a color pixel when said white pixel determination section and said black pixel determination section both determine in the negative, and
   when a corresponding pixel of a previous line of the line, including the color pixel, in the sub-scanning direction is determined as a color pixel by said color attribute determination section, said color pixel determination section determines a color attribute of the pixel of interest as a continuous color pixel, whereas when the corresponding pixel of the previous line of the line, including the color pixel, in the sub-scanning direction is not determined as a color pixel by said color attribute determination section, said color pixel determination section determines a color attribute of the pixel of interest as a non-continuous color pixel.

7. The image processing apparatus according to claim 6, wherein said storage section comprises:
   a line storage section, arranged to store a color attribute of each pixel with respect to a predetermined line of the multi-valued image; and
   a window storage section, arranged to store in a window form a color attribute of each pixel of the line stored in said line storage section and a color attribute of each pixel of a next line of said line in the sub-scanning direction.

8. The image processing apparatus according to claim 7, wherein said window storage section comprises:
   a first window storage section, arranged to store the color attribute of each pixel in a first window form, which is constructed with M pixels in the main scanning direction and 2 pixels in the sub-scanning direction; and
   a second window storage section, arranged to the color attribute of each pixel in a second window form, which is constructed with N pixels in the main scanning direction and 2 pixels in the sub-scanning direction.

9. The image processing apparatus according to claim 8, wherein said first counting section comprises:
- a first array attribute counting section, arranged to obtain a first array attribute number by counting in the second block unit a number of windows when a pixel of interest is a color pixel and the pixel of interest has at least one adjacent black pixel, in said first window storage section;
- a second array attribute counting section, arranged to obtain a second array attribute number by counting in the second block unit a number of windows when a window area except four pixels on both edges vertically consecutively has color pixels and there is no black pixel in a window area including the four pixels on both edges, in said second window storage section;
- a third array attribute counting section, arranged to obtain a third array attribute number by counting in the second block unit a number of windows when there are consecutive color pixels in a window area, having I pixels in the main scanning direction and 2 pixels in the sub-scanning direction, in said second window storage section; and
- a fourth array attribute counting section, arranged to obtain a fourth array attribute number by counting in the second block unit a number of windows when the pixel of interest is a color pixel and there is no black pixel in the periphery of the color pixel, in said first window storage section.

10. The image processing apparatus according to claim 9, wherein said second counting section comprises a fifth array attribute counting section arranged to obtain a black pixel counted value by counting in the second block unit a number of pixels determined as a black pixel by said black pixel determination section.

11. The image processing apparatus according to claim 9, wherein said calculation section comprises:
- a first calculation section, arranged to obtain a first parameter by using a ratio between the first array attribute number and the second array attribute number; and
- a second calculation section, arranged to obtain a second parameter by using a ratio between the fourth array attribute number and the black pixel counted value.

12. The image processing apparatus according to claim 1, wherein said block attribute determination section determines the image attribute of the first block by respectively comparing the counted values of said first and second counting sections and the first parameter and the second parameter calculated by said calculation section, with respective predetermined threshold values.

13. The image processing apparatus according to claim 2, wherein said line attribute determination section determines whether or not the image attribute of the first line group is a monochrome image based on the determination result of said block attribute determination section, and
said final determination section determines the image attribute of the commonly included third line group as a monochrome image when image attributes of the first line group and the second line group are determined as a monochrome image.

14. The image processing apparatus according to claim 2, wherein the first line group and the second line group have a same number of lines.

15. The image processing apparatus according to claim 14, wherein the third line group has half the number of lines as the first line group or the second line group.

16. The image processing apparatus according to claim 2, further comprising an image processing section arranged to perform image processing on the third line group in accordance with an image attribute of the third line group, which is determined by said final determination section.

17. The image processing apparatus according to claim 2, further comprising an image printing section arranged to print the multi-valued image in units of predetermined lines, wherein a unit of predetermined lines has a same number of lines as the third line group.

18. The image processing apparatus according to claim 17, wherein said image printing section comprises a monochrome printhead and a color printhead employing an inkjet printing method, wherein the monochrome printhead is longer than the color printhead.

19. An image processing method comprising the steps of:
determining a color attribute of a pixel of a multi-valued image based on a luminance signal of each pixel;
- storing in a predetermined storage device the color attribute, determined in the color attribute determining step, with respect to pixels of a predetermined area including a pixel of interest;
- counting an array attribute, determined in accordance with an array of the color attribute stored in the storage device, with respect to a second block having a predetermined number of lines in a first block, wherein the first block is obtained by dividing a predetermined first line group of the multi-valued image in the main scanning direction;
- counting with respect to the second block the color attribute determined in the color attribute determining step;
- calculating a parameter, indicative of an image characteristic of the first block, based on counted values obtained in the first and second counting steps;
- determining an image attribute of the first block in accordance with the counted values obtained in the first and second counting steps and the parameter calculated in the calculating step; and
- determining an image attribute of the first line group based on a determination result obtained in the block attribute determining step.

20. The image processing method according to claim 19, further comprising the step of determining an image attribute of a third line group, included commonly in the first line group and the second line group, based on the determination result of the first line group determined in the line attribute determining step and a determination result of the predetermined second line group.

21. The image processing method according to claim 19, wherein the color attribute determining step comprises the steps of:
- determining whether or not the pixel is a white pixel;
- determining whether or not the pixel is a black pixel; and
- determining whether or not the pixel is a color pixel.

22. The image processing method according to claim 21, wherein in the color pixel determining step, the pixel is determined as a color pixel when determination results are in the negative in the white pixel determining step and the black pixel determining step, and
when a corresponding pixel of a previous line of the line, including the color pixel, in the sub-scanning direction is determined as a color pixel in the color attribute determining step, a color attribute of the pixel of interest is determined as a continuous color pixel, whereas when the corresponding pixel of the previous line of the line, including the color pixel, in the sub-scanning direction is not determined as a color pixel in the color attribute determining step, a color attribute of the pixel of interest is determined as a non-continuous color pixel.

23. A computer-readable storage medium storing a computer-executable program causing a computer to execute a method of processing an image, the method comprising the steps of:

determining procedure for determining a color attribute of a pixel of a multi-valued image based on a luminance signal of each pixel;

storing in a predetermined storage device the color attribute, determined in the color attribute determining step, with respect to pixels of a predetermined area including a pixel of interest;

counting an array attribute, determined in accordance with an array of the color attribute stored in the storage device, with respect to a second block having a predetermined number of lines in a first block, wherein the first block is obtained by dividing a predetermined first line group of the multi-valued image in the main scanning direction;

counting with respect to the second block the color attribute determined in the color attribute determining step;

calculating a parameter, indicative of an image characteristic of the first block, based on counted values obtained in the first and second counting steps;

determining an image attribute of the first block in accordance with the counted values obtained in the first and second counting steps and the parameter calculated in the calculating step;

determining an image attribute of the first line group based on a determination result obtained in the block attribute determining step; and     determining an image attribute of a third line group, included commonly in the first line group and the second line group, based on the determination result of the first line group determined in the line attribute determining step and a determination result of the predetermined second line group.

\* \* \* \* \*